(12) United States Patent
Hsu

(10) Patent No.: US 10,446,977 B2
(45) Date of Patent: Oct. 15, 2019

(54) LENS SURROUNDED BY MAGNET

(71) Applicant: FOXCONN INTERCONNECT TECHNOLOGY LIMITED, Grand Cayman (KY)

(72) Inventor: Shuo-Hsiu Hsu, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/846,120

(22) Filed: Dec. 18, 2017

(65) Prior Publication Data

US 2018/0175547 A1 Jun. 21, 2018

(30) Foreign Application Priority Data

Dec. 16, 2016 (CN) .......................... 2016 1 1165366

(51) Int. Cl.
*H01R 13/62* (2006.01)
*H04B 10/80* (2013.01)

(52) U.S. Cl.
CPC ....... *H01R 13/6205* (2013.01); *H04B 10/803* (2013.01)

(58) Field of Classification Search
CPC .......................... G02B 6/3817; H01R 13/6205
See application file for complete search history.

(56) References Cited

U.S. PATENT DOCUMENTS

| | | | | |
|---|---|---|---|---|
| 4,844,582 | A * | 7/1989 | Giannini | G02B 6/3817 385/57 |
| 5,401,175 | A * | 3/1995 | Guimond | H01R 13/6205 439/38 |
| 9,568,678 | B2 * | 2/2017 | Isenhour | G02B 6/32 |
| 9,829,655 | B2 * | 11/2017 | Erdman | G02B 6/3886 |
| 10,082,629 | B2 * | 9/2018 | Mitsui | G02B 6/322 |
| 2010/0080563 | A1 * | 4/2010 | DiFonzo | G02B 6/3817 398/115 |
| 2013/0157477 | A1 | 6/2013 | Keyssa | |
| 2014/0112627 | A1 * | 4/2014 | Isenhour | G02B 6/32 385/88 |
| 2015/0078714 | A1 * | 3/2015 | Isenhour | G02B 6/4204 385/93 |
| 2017/0097484 | A1 * | 4/2017 | Teo | G02B 6/4284 |
| 2017/0160498 | A1 * | 6/2017 | Zhao | G02B 6/4214 |
| 2017/0269312 | A1 * | 9/2017 | Mitsui | G02B 6/4204 |
| 2017/0288740 | A1 * | 10/2017 | Castell | H01F 38/14 |
| 2017/0299816 | A1 * | 10/2017 | Mitsui | G02B 6/32 |
| 2018/0175548 | A1 * | 6/2018 | Hsu | H01R 13/6205 |

* cited by examiner

*Primary Examiner* — Sung H Pak
(74) *Attorney, Agent, or Firm* — Wei Te Chung; Ming Chieh Chang

(57) ABSTRACT

A coupling system includes a first connecting unit and a second connecting unit adapted to be connected to each other. Each of the first connecting unit and a second connecting unit includes an enclosure with a substantial even mating surface and a pair of lens module. Each lens module includes a lens enclosed within a magnet, and the magnets of the coupled lens modules have opposite magnet poles around the corresponding mating surfaces. The pair of lens modules are further equipped with a transmitting chip and a receiving chip in aligned with the corresponding lens, respectively.

4 Claims, 7 Drawing Sheets

LENS SURROUNDED BY MAGNET

1. FIELD OF THE DISCLOSURE

The invention is related to an optical and electrical connector assembly used in a coupling system, and particularly to the connector equipped with the magnet surrounding the optical lens for precise alignment therebetween. The instant application relates to the copending application having the same applicant, the same filing date and a title of "ALIGNMENT STRUCTURES FOR CHIP MODULES".

2. DESCRIPTION OF RELATED ARTS

The existing high frequency microwave chip may perform high speed signal transmission. Anyhow, it is required to have the two corresponding chips coupled precisely for eliminating the transmission loss. At the same time, it is also required to have the lens associated with the chip for optical signal transmission. The traditional connection is to use a pair of connectors, of which one has a protruding structure and the other has a recessed structure receiving such a protruding structure therein for aligning and retaining the coupled connector together. Anyhow, such arrangement may fit for the traditional heavy duty style while not for the modern type requiring the smooth interface and gentle treatment.

It is desired to provide a connector assembly for both electrical and optical transmission thereof with an easy coupling device thereof.

SUMMARY OF THE DISCLOSURE

To achieve the above desire, a coupling system includes a first connecting unit and a second connecting unit adapted to be connected to each other. Each of the first connecting unit and a second connecting unit includes an enclosure with a substantial even mating surface and a pair of lens module. Each lens module includes a lens enclosed within a magnet, and the magnets of the coupled lens modules have opposite magnet poles around the corresponding mating surfaces. The pair of lens modules are further equipped with a transmitting chip and a receiving chip in aligned with the corresponding lens, respectively. Each of the first connecting unit and the second connecting unit further includes an electrical connection set for mating with that of the other, and has an absorption device for filtering noise during transmission. During coupling, the mating surfaces are mated with each other with the magnets of the pair of magnet modules of the first connecting unit coupled with those of the second connecting unit.

DETAILED DESCRIPTION OF THE PREFERRED EMBODIMENT

Figure 1:
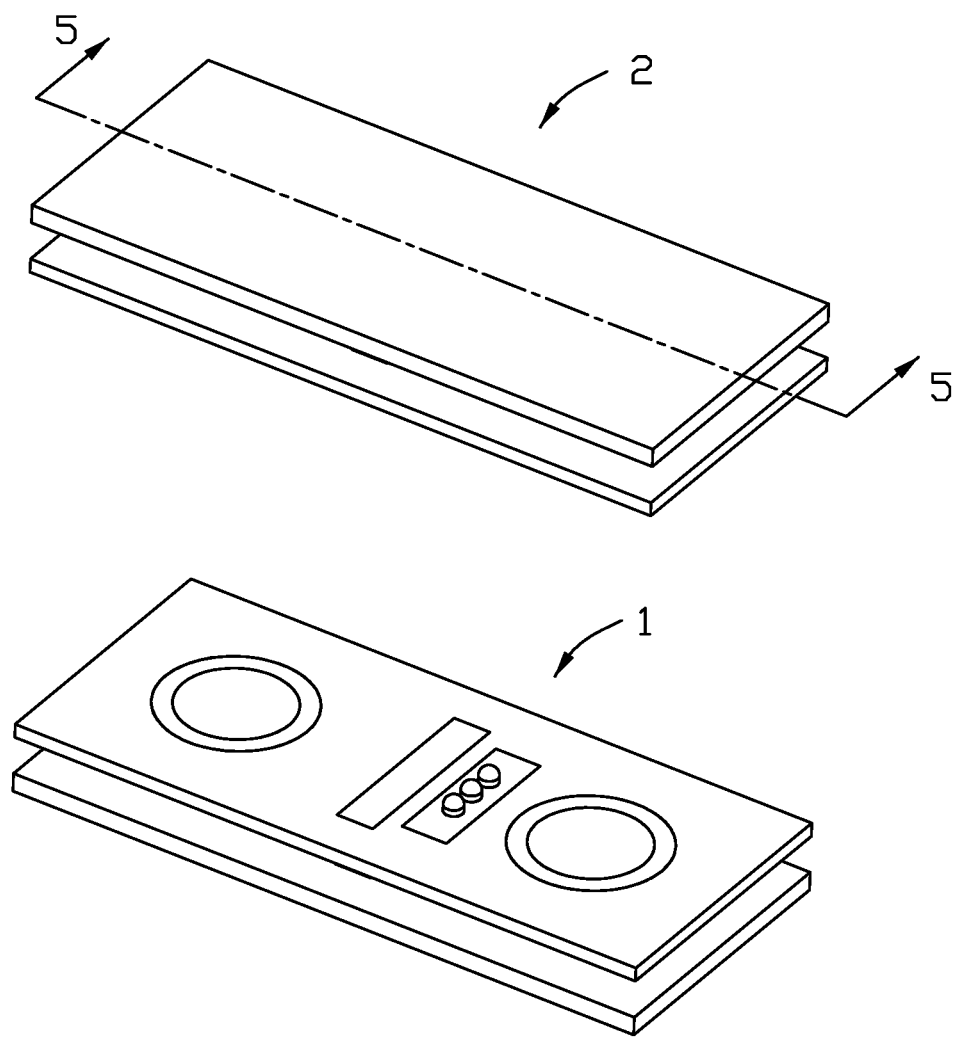
FIG. 1 is a perspective view of the coupling system according to a first embodiment of the invention.
Figure 2:
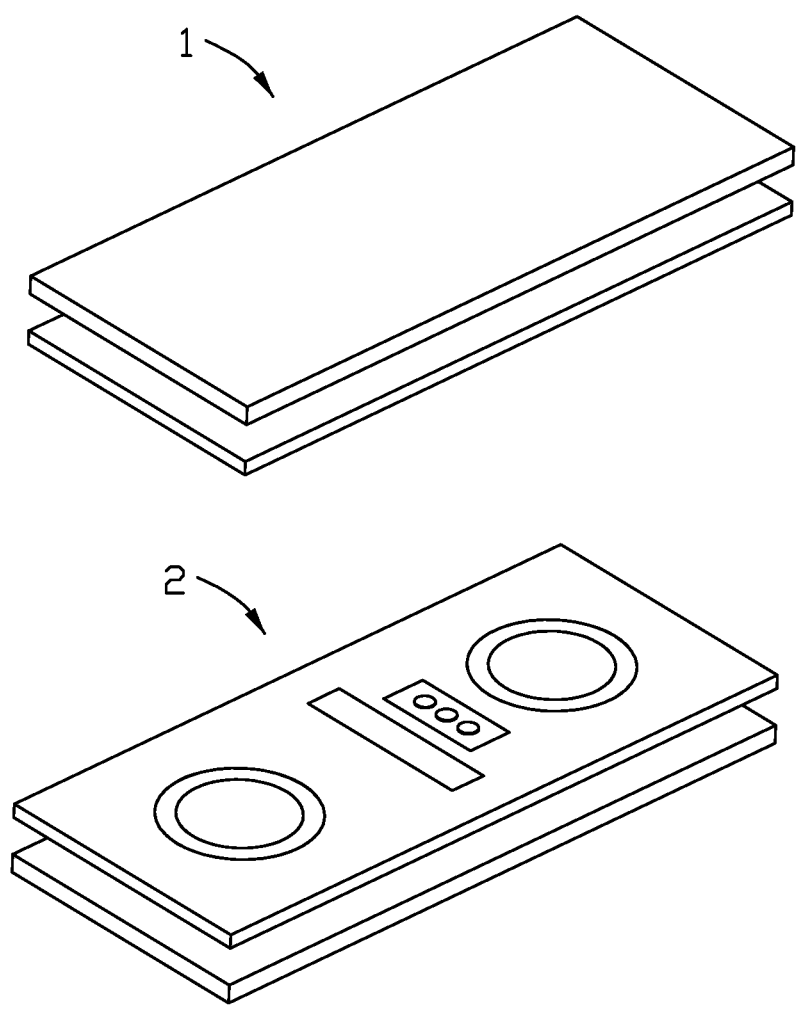
FIG. 2 is another perspective view of the coupling system of FIG. 1.
Figure 3:
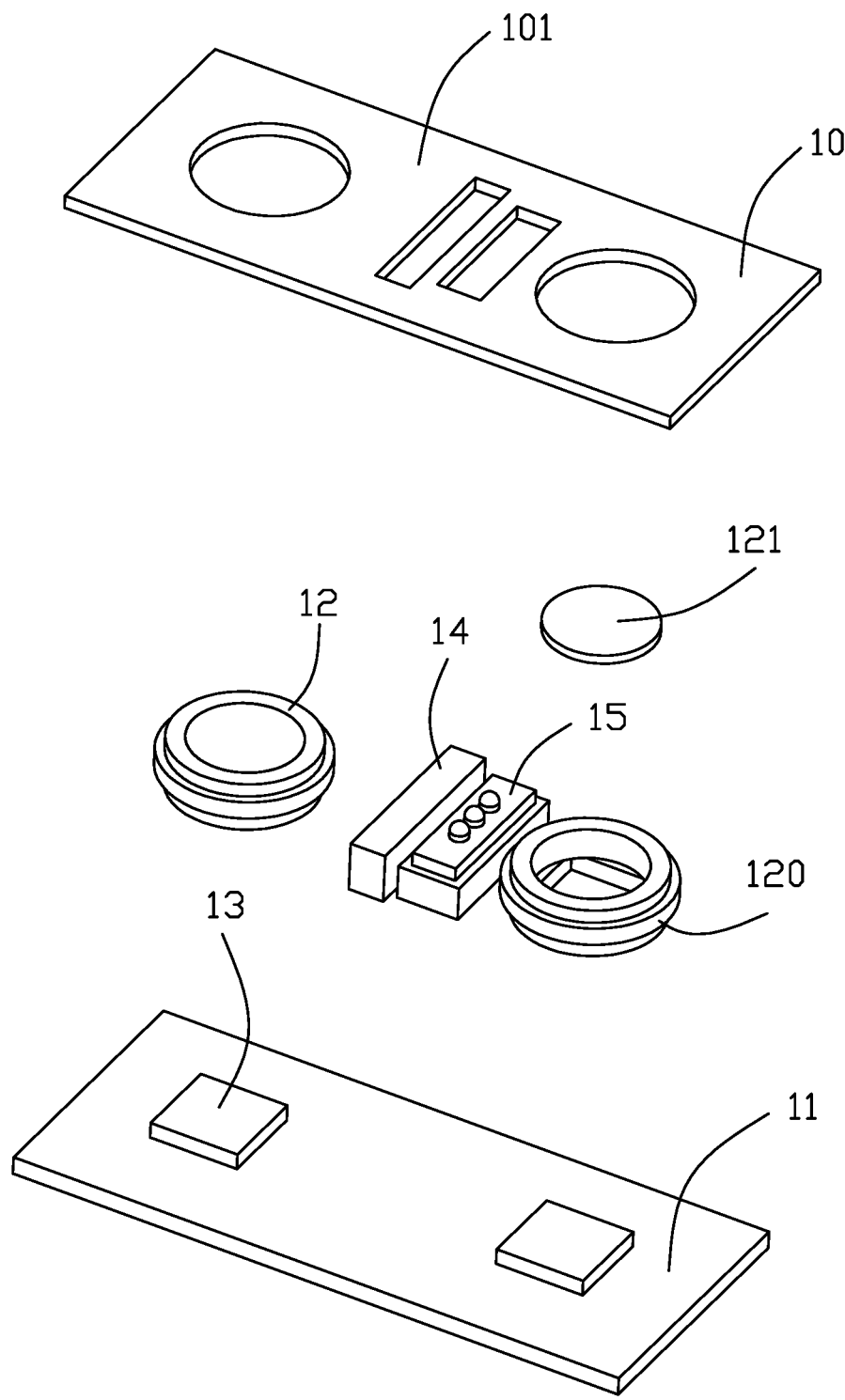
FIG. 3 is an exploded perspective view of the first connecting unit of the coupling system of FIG. 1.
Figure 4:
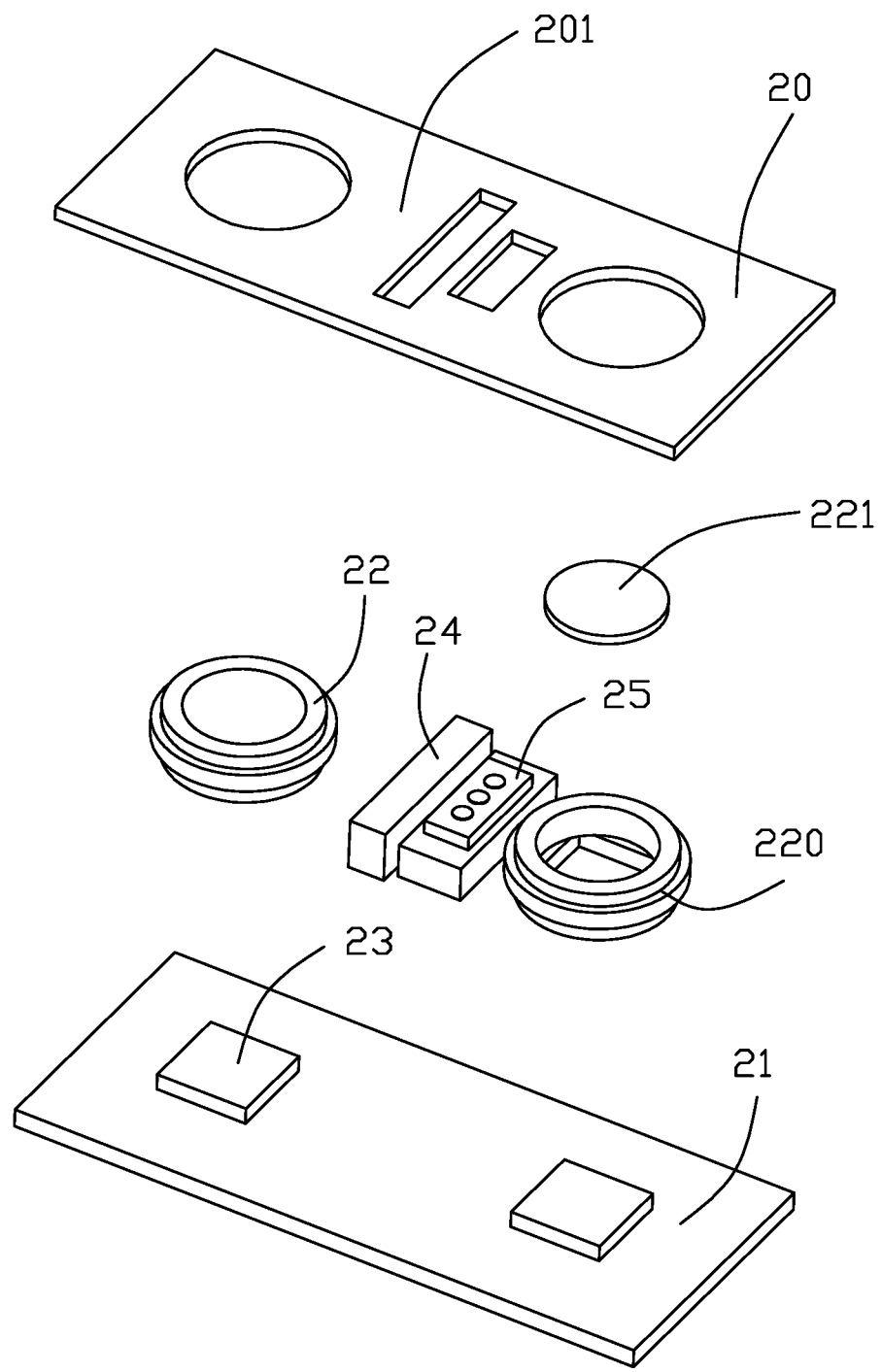
FIG. 4 is an exploded perspective view of the second connecting unit of the coupling system of FIG. 1.
Figure 5:
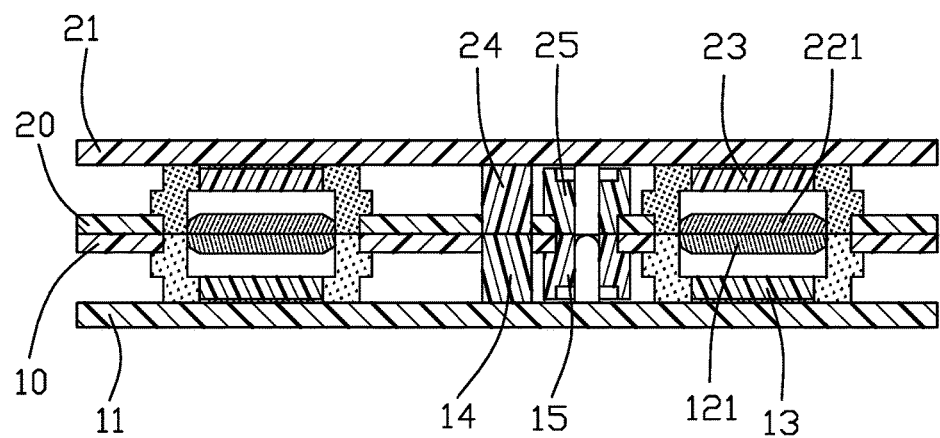
FIG. 5 is a cross-sectional view of the coupling system of FIG. 1.

Reference will now be made in detail to the embodiments of the present disclosure. Referring to FIGS. 1-5, A coupling system includes a first connecting unit 1 and a second connecting unit 2 used on the electronic devices for signal transmission therebetween.

The first connecting unit 1 includes an enclosure 10, a printed circuit board 11 and a pair of lens modules 12 both retained in the enclosure 10. The enclosure forms an even mating surface 101 for easy mating. The lens module 12 is mounted upon the printed circuit board 11. The lens module 12 is exposed upon and flush with the mating surface 101. The lens module 12 includes a ring type magnet 120 and the lens 121 enclosed within the magnet 12 in a concentric manner. The magnet pole of one of the pair of lens module 12 is opposite to the other of the pair of lens module 12.

In this embodiment, the magnet 120 is unitarily formed and the lens 121 is attached within the magnet 120. In other embodiments, the magnet may includes two pieces to sandwich the corresponding lens in position. In this embodiment, the high frequency microwave chip 13 for extremely high frequency communication as mentioned in U.S. Pat. No. 8,909,135, is mounted upon the printed circuit board 11 and enclosed within the corresponding magnet 120 so as to be aligned with the corresponding lens 121 within the same magnet 120 for high speed transmission. Understandably, one of the lens module 12 includes the transmitter chip while the other includes the receiver chip for signal transmission and receiving, and the corresponding lens 121 as well.

The first connecting unit 1 further includes an absorption device 14 and the electrical connector 15 commonly mounted upon the printed circuit board 11 and located between the pair of lens module 12. Similar to the lens modules 12, both the absorption device 14 and the electrical connector 15 are exposed upon and essentially flush with the mating surface 101. The absorption device 14 is used to filter the noise derived from the chips 13. The electrical connector 15 is used to transmit both the electrical signal and the power. The electrical connector of the first connecting unit 1 is of the pogo pin type connector having the corresponding pogo pins slightly protruding beyond the mating surface 101 in retractable manner. Notably, the enclosure 10 forms corresponding through holes (not labeled) to expose the lens module 12, the absorption device 14 and the electrical connector 15.

The second connecting unit 2 is generally similar to the first connecting unit 1 except the structure of the electrical connector illustrated later. The second connecting unit 2 includes an enclosure 20, a printed circuit board 21 and a pair of lens modules 22. The enclosure 20 forms an even mating surface 201 for easy mating. Each lens module 22 includes a ring type magnet 220 and the lens 221 enclosed within the magnet in a concentric manner. The magnet pole of one of the lens modules 22 is opposite to the other of the lens module 22. The second connecting unit 2 further includes the chips 23 respectively received within the corresponding magnets 220, and the absorption device 24 and the electrical connector 25 commonly mounted upon the printed circuit board 21 and located between the pair of lens modules 22. The enclosure 20 also includes holes (not labeled) to expose the corresponding lens module 22, the absorption device 24 and the electrical connector 25. The difference between the electrical connector 25 and the electrical connector 15 is that the electrical connector 25 is not of the pogo pin type but with the pad type conductors thereof for complementarily complying with the pogo pin type electrical connector 15.

Figure 6:
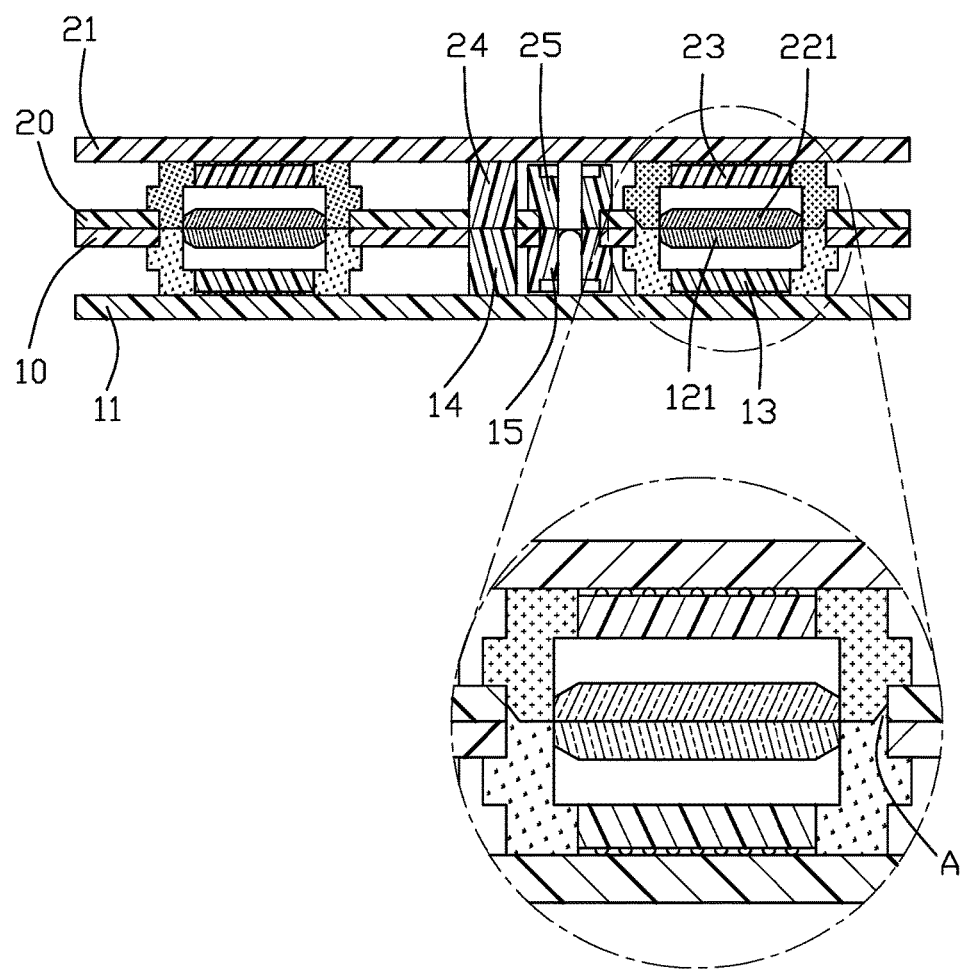
FIG. 6 is a cross-sectional view of the coupling system according to a second embodiment of the invention.
Figure 7:
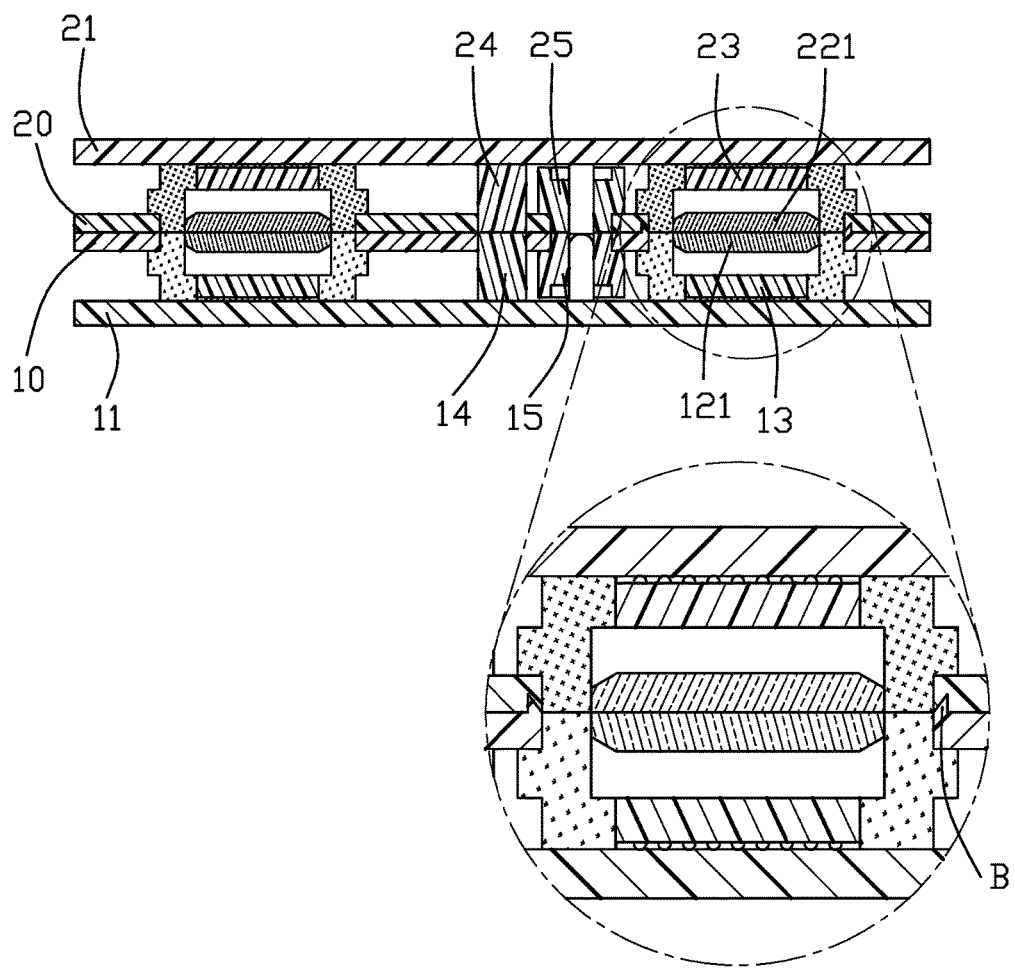
FIG. 7 is a cross-sectional view of the coupling system of a third embodiment of the invention.

When the first connecting unit 1 and the second connecting unit 2 are coupled with each other in a confrontation between the mating surface 101 of the first connecting unit 1 and the mating surface 201 of the second connecting unit 2, via attraction forces generated between the paired magnets 120 and 220 and the possible sliding movement between the mating surface 101 and the mating surface 201, the lens modules 12 and the corresponding lens modules 22 are respectively aligned with each other in the vertical direction in a situation that the magnets 120 are intimately connected to the corresponding magnets 220 in the vertical direction, respectively. Thus, an optimal coupling between the lens module 12 and the corresponding lens module 22 are achieved, and a reliable optical transmission is assured. At the same time, the electrical connector 15 and the electrical connector 25 are also precisely connected. Understandably, the magnet pole of the magnet 120 of the lens module 12 of the first connecting unit 1 should be opposite to that of the lens module 22 of the second connecting unit 2 for obtaining the magnetic attraction force therebetween. Understandably, the paired lens module 12 and lens module 22 should be complementary with each other between signal transmission and receiving FIG. 6 discloses a similar embodiment except that the annular guiding rim structure A is formed on the magnet 120 and an annular groove (not labeled) is formed in the magnet 220 for facilitating aligning between the magnet 120 and the magnet 220. Similarly, FIG. 7 discloses another similar embodiment except that adjacent to the corresponding lens modules 12 and 22, the annular guiding rim structure B is formed on the enclosure 10 and an annular groove (not labeled) is formed in the enclosure 20 for facilitating aligning between the magnet 120 and the magnet 220. Notably, because the annular guiding rim only slightly projects beyond the mating surface 101, the whole connecting unit 1 is still deemed to be essentially formed with an even or smooth mating surface 101. In other words, in all embodiments, the lens 121 and 221 are essentially flush with the mating surface 101, 201 for intimate superior coupling therebetween. Understandably, the round ring type structure of the magnet and the corresponding lens are concentric with each other for facilitating precise alignment between the coupled lenses in the vertical direction.

While a preferred embodiment according to the present disclosure has been shown and described, equivalent modifications and changes known to persons skilled in the art according to the spirit of the present disclosure are considered within the scope of the present disclosure as described in the appended claims.

What is claimed is:

1. A coupling system comprising:
    a first connecting unit similar to and coupled with a second connecting unit,
    each of the first connecting unit and the second connecting unit including:
    an enclosure enclosing both a printed circuit board and a pair of lens modules, the enclosure providing an even mating surface, each of the lens modules including a magnet enclosing a lens; wherein
    at least the magnet of the lens module is exposed upon and flush with a mating surface; wherein
    each of the first connecting unit and the second connecting unit further includes a single electrical connector mounted upon the printed circuit board between the pair of lens module and exposed upon the mating surface; wherein
    said single electrical connector in the enclosure of the first connecting unit is of a pogo pin type slightly projecting out of the mating surface, while the electrical connector in the enclosure of the second connecting unit is of a pad type for complementarily complying with the pogo pin type; wherein each of the first connecting unit and the second connecting unit further includes an absorption device located beside the electrical connector and between the pair of lens modules to filter noise derived from a chip of each of the lens modules.

2. The coupling system as claimed in claim 1, wherein the absorption device is exposed upon and essentially flush with the mating surface.

3. A connecting unit for use in a coupling system, comprising:
    an enclosure enclosing both a printed circuit board and a pair of lens modules, the enclosure providing an even mating surface, each of the lens modules including a magnet enclosing a lens; wherein
    at least the magnet of the lens module is exposed upon and flush with a mating surface;
    further including a single electrical connector mounted upon the printed circuit board and exposed upon the mating surface; wherein
    said single electrical connector is located between the pair of lens module; further including an absorption device located beside the electrical connector and between the pair of lens modules to filter noise derived from a chip of each of the lens modules.

4. The connecting unit for use in the coupling system as claimed in claim 3, wherein the absorption device is exposed upon and essentially flush with the mating surface.

* * * * *